Jan. 2, 1951  C. D. WEST  2,536,895
MOLDING COVER
Filed Sept. 14, 1949

INVENTOR.
C. D. WEST
BY
Ayat Dowell
ATTORNEY

Patented Jan. 2, 1951

2,536,895

UNITED STATES PATENT OFFICE 2,536,895

MOLDING COVER

Charles Dowling West, Orlando, Fla.

Application September 14, 1949, Serial No. 115,647

6 Claims. (Cl. 296—49.2)

This invention relates to upholstery and more particularly to a protective covering for molding of the kind commonly employed in a door or side of a vehicle such as an automobile, boat, airplane and the like bordering a window. The window sill or molding of a conventional vehicle is so positioned that when the window is opened the sill is frequently exposed to the elements, including the sun's rays, wind, rain and the like. Furthermore, the driver or other occupant of the vehicle frequently rolls down the window adjacent his seat and uses the sill as an arm rest. This results in wear on the sill and in warm weather corrosive perspiration is frequently deposited thereon, and this, coupled with the constant rubbing back and forth of the arm across the sill produces rapid deterioration of the sill finish. As a result of this, after a relatively short time the sills of many vehicles present a worn and corroded appearance.

Heretofore the use of protective coverings for the sill has been known but these have usually been of the type which overlie the top of the window when it is in its lowered position, and must be removed before the window can be raised. As a result of this inconvenience the use of this type of covers has been limited.

Accordingly, it is an object of the present invention to provide a sill cover which is adapted for use with nearly all the various makes of vehicles, which is easily attached thereto and which may remain in place regardless of the position of the window pane.

A further object of the invention is the provision of a sill cover kit which includes parts of a range of sizes so that the cover may be attached to almost all of the various makes and sizes of vehicles.

A still further object of the invention is the provision of a sill cover which is particularly adapted for expeditious attachment to the sill of a conventional vehicle.

Figure 1:
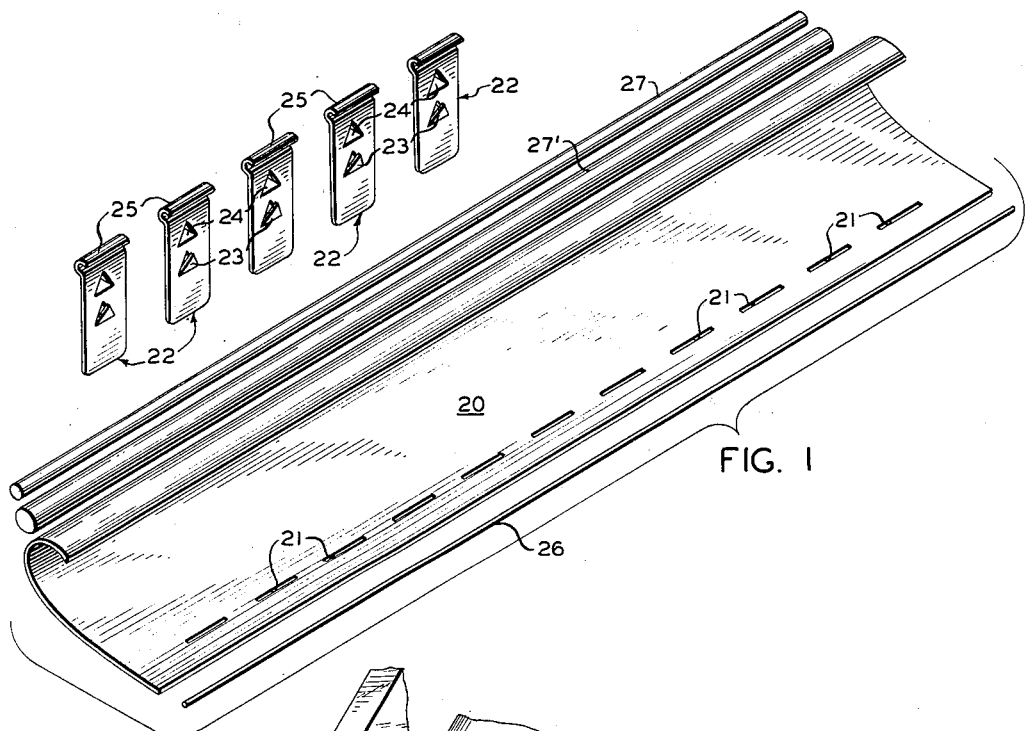
Figure 2:
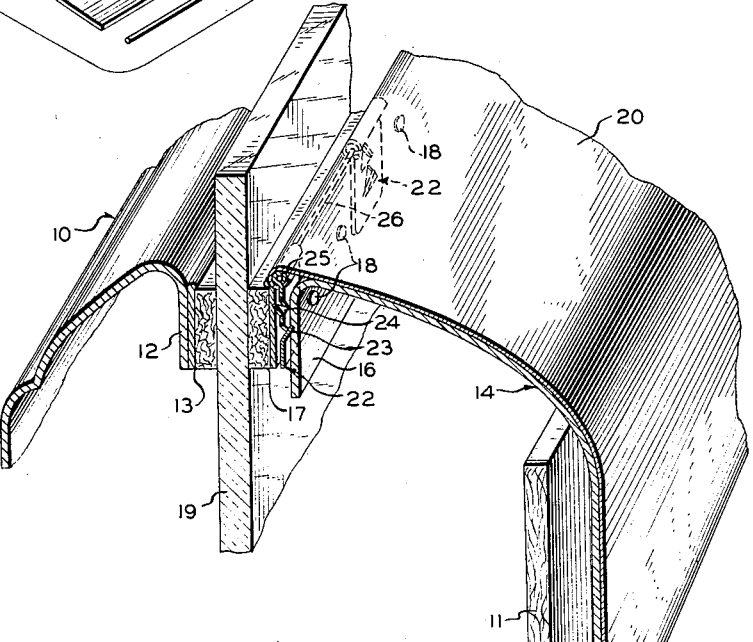

Further objects and advantages of the present invention will become apparent from the following description taken in conjunction with the accompanying drawings, wherein:

Fig. 1 is an exploded view illustrating a sill cover kit constructed in accordance with the present invention; and, Fig. 2, a perspective view in section, illustrating a sill cover in operative position.

Referring to the drawings, a conventional vehicle, such as an automobile, has a door or side presenting on its exterior a door or side panel 10 which is usually of sheet metal, and an interior panel or support 11 which is usually upholstery backed by a sheet of supporting material, such as wood or the like. The panel 10 has a downwardly curved flange 12 to which a window guide strip 13, which is comprised generally of a combination of felt and metal, is attached. A sill or molding 14 having a lower curved flange 15 and an upper downwardly extending flange 16 is provided for a smooth joint from the panel 11 to the panel 10. Guide strips 17 of the same material as the strips 13 are attached by rivets 18 or the like to the outer face of the flange 16 of the molding 14. The strips 13 and 17 are oppositely disposed and adapted to receive a pane of glass 19 therebetween, which glass is adapted to slide up and down in the door or side of the vehicle.

Inasmuch as the molding 14 is disposed within the vehicle and at a height convenient for supporting the arm of an individual riding therein, it is customary for the driver and other occupants to rest an arm thereon when the window is down. In order to protect the molding or to provide an attractive cover therefor, a substantially rectangular length of sheet material 20 is provided whose dimensions are sufficient to cover most sills of conventional vehicles. Inasmuch as certain groups of vehicles such as two door and four door automobiles may have window sills of substantially different lengths, the invention contemplates the provision of material of various widths, although a wider piece may easily have its ends folded under if necessary in order to fit the material to the particular window sill at hand. The material 20 may be of cloth, plastic, leather, leatherette, or other sheet material. Spaced from one side of the material is a plurality of spaced aligned slots or openings 21 for the reception of clips 22 which are designed to attach the material to the molding next to the window. Each of these clips comprises a substantially rectangular flat sheet metal member having a plurality of prongs 23 and 24 struck from the member and projecting on opposite sides thereof and adapted to resist movement in one direction when placed between members in which the prongs may catch or imbed. The extremity or head of the member toward which the prongs 23 and 24 open is provided with an offset grooved or flanged portion 25 for the reception of a wire or the like 26 which extends lengthwise of the material adjacent the slots 21 for holding one side of the material next to the molding.

For holding the other side of the material next to the molding a dowel 27 or 27' is provided, these being supplied in a plurality of sizes, as shown, in order that the cover may be easily attached to various types of sills.

In installing the device the window is preferably lowered and the material laid with the slots 21 along the joint between the flange 16 and the strip 17, with its under side up and the wide side of the material next to the slots lying over the top of the glass and the side 10 of the vehicle. If the strip is too long for the molding to which it is to be attached, it may be reduced in length preferably by turning its ends inwardly, this procedure presenting a smooth appearance after the cover is installed. The wire 26 is then cut to the proper length, if necessary, and laid over the slots 21. The ends of the clips 22 are then slipped through the slots and into the space between the window guide strip 17 and the upper downwardly extending flange 16 and their flanges 25 engaged with the wire in order to secure the cover adjacent the upper portion of the molding. The material is then folded back over the wire and positioned overlying the molding 14. A dowel 27 or 27' is then selected, reduced in length if necessary to fit the molding, and is placed next to the material at the joint between the flange 15 and the panel 11 and forced upwardly to the position shown in Fig. 2. The material may be drawn tight by pulling the edge thereof downwardly, the dowel functioning like a pulley. The excess may then be trimmed below the joint.

It will be readily understood that the clips and the wire will retain the upper side of the cover in place and the dowel the lower side and that the operation of the window will not be interfered with in the least.

The installation of the device may be easily done by an unskilled individual, and requires no special tools or the like.

The invention contemplates the provision of a relatively large number of slots 21 in the sheet material 20 in order that the clips 22 may be so positioned that their use may not be prevented by the rivets 18. In other words only a few clips are necessary to retain the material in place and after positioning the material on the sill it will be easy to select slots so positioned that the clips may be secured in place without contacting a rivet.

The present invention therefore includes the provision of a cover and attaching means for substantially universal application to the window molding of conventional vehicles, it being a simple matter to adapt the cover and the attaching means to various sizes and types of sills and to install the same.

Although the cover is described as particularly adapted for use with vehicle window sills, it is applicable to a wide variety of uses and may be readily employed with structure other than window sills.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A cover for a vehicle window molding in which the molding has a lower edge adjacent the vehicle side panel and an upper edge connected to a window guide strip by a plurality of fastening members, comprising an elongated rectangular sheet material member having a plurality of aligned spaced slots adjacent a side edge of the sheet material member, a wire member of approximately the length of the molding positioned adjacent the slots, the sheet material member being folded about the wire member adjacent the slots, a plurality of clips extending through said plurality of slots at spaced intervals and positioned between the upper edge of the molding and the window guide strip, each of the clips having a flange engaging the wire and one or more prongs struck from the clip engaging the molding and/or the window strip such that they resist removal from therebetween, and a dowel engaging a fold of the material adjacent the other side edge and being positioned between the lower edge of the molding and the vehicle panel, the sheet material member being extended between the upper and the lower edges of and covering the molding.

2. A cover for a window sill in which the sill has a lower portion adjacent the sill support and an upper portion connected to a window strip, comprising an elongated sheet material member having a plurality of aligned slits adjacent an edge thereof, a relatively thin first elongated member positioned adjacent the slits, one or more fasteners extending through one or more slits and positioned between the upper portion of the sill and the window strip, means for engaging each of the fasteners with the first elongated member, means for resisting removal of the fasteners from between the sill and the window strip, and a second elongated member engaging a fold of the sheet material member adjacent its other edge and positioned between the lower portion of the sill and the sill support, the sheet material member being extended between the upper and the lower portions of the sill and providing a cover therefor.

3. A cover for a window sill in which the sill has a lower portion adjacent the sill support and an upper portion connected to a window strip, comprising an elongated sheet material member having a plurality of slits, a first elongated member positioned adjacent the slits, fastening means engaging the first elongated member and extending through the slits and positioned between the upper portion of the sill and the window strip, and a second elongated member engaging the sheet material and positioned between the lower portion of the sill and the sill support, the sheet material member being extended between the upper and the lower portions of the sill and providing a cover therefor.

4. A cover for a window sill in which the sill has a lower portion adjacent the sill support and an upper portion connected to a window strip, comprising an elongated sheet material member, a first elongated member positioned along the sheet material member, fastening means engaging the first elongated member and extending through the sheet material member and positioned between the upper portion of the sill and the window strip, and a second elongated member engaging the sheet material member and positioned between the lower portion of the sill and the sill support, the sheet material member being extended between the upper and lower portions of the sill and providing a cover therefor.

5. A window sill cover kit for a sill having a lower portion adjacent the sill support and an upper portion connected to a window strip, comprising an elongated sheet material member having a plurality of aligned slits adjacent one of its side edges, a relatively thin elongated member adapted to overlie the sheet material member adjacent the slits, a plurality of elongated members varying in increasing thicknesses from approximately that of the relatively thin elongated member, and a plurality of fasteners each comprising a thin flat body having one or more prongs and adapted to pass through a slit in the sheet material member and be received between the upper portion of the sill and the window strip and a head adapted to engage the relatively thin elongated member whereby the relatively thin elongated member and the fasteners may secure one of the sides of the sheet material member to the upper portion of the sill and one of the other elongated members may be selected to fit between the lower portion of the sill and the sill support to engage the other side of the sheet material member to hold the member in position covering the sill.

6. A window sill cover kit for a sill having a lower portion adjacent the sill support and an upper portion connected to a window strip, comprising an elongated sheet material member, a relatively thin elongated member adapted to overlie the sheet material member, a plurality of elongated members varying in increasing thicknesses from approximately that of the relatively thin elongated member, and a plurality of fasteners each comprising a thin flat body having one or more prongs and adapted to pass through the sheet material members and be received between the upper portion of the sill and the window strip and a head adapted to engage the relatively thin elongated member, whereby the relatively thin elongated member and the fasteners may secure one of the sides of the sheet material member to the upper portion of the sill and one of the other elongated members may be selected to fit between the lower portion of the sill and the sill support to engage the other side of the sheet material member to hold the member in position covering the sill.

CHARLES DOWLING WEST.

REFERENCES CITED

The following references are of record in the file of this patent:

UNITED STATES PATENTS

| Number | Name | Date |
| --- | --- | --- |
| 1,643,395 | Smith | Sept. 27, 1927 |
| 1,782,695 | Prez | Nov. 25, 1930 |
| 2,462,768 | Ortleb | Feb. 22, 1949 |
| 2,504,234 | Strickland | Apr. 18, 1950 |